March 7, 1967  P. E. MILLER  3,307,724
ATTACHMENT FOR INDUSTRIAL DUMP TRUCKS
Filed Oct. 23, 1965  5 Sheets-Sheet 1

Inventor
Paul E. Miller
Attorney

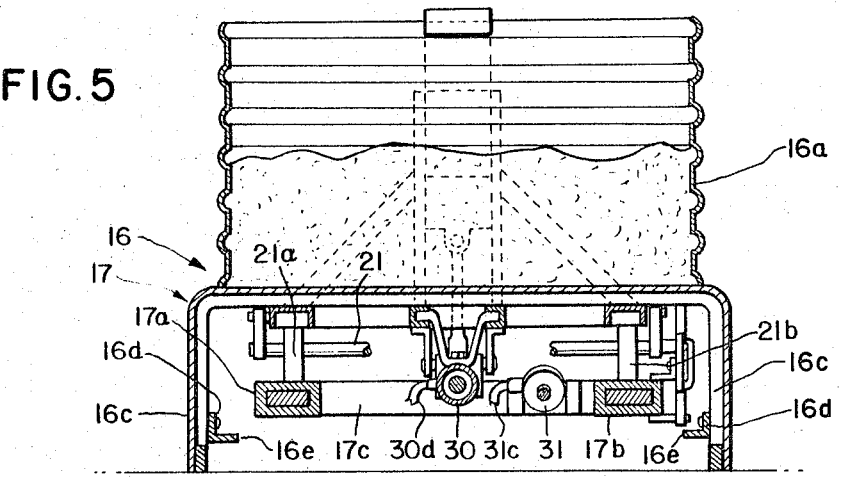
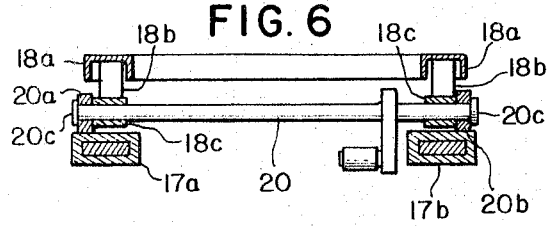
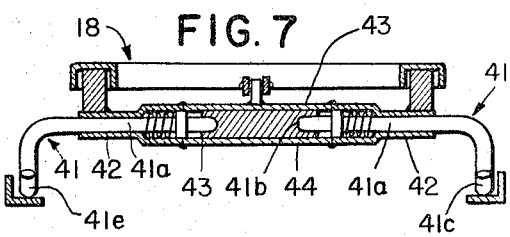
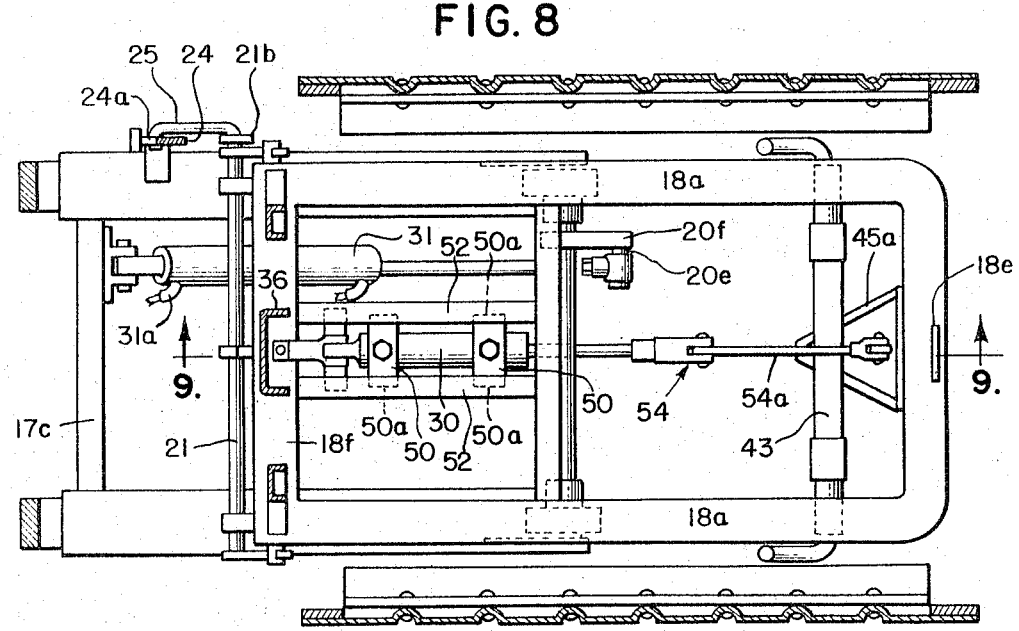

March 7, 1967 P. E. MILLER 3,307,724
ATTACHMENT FOR INDUSTRIAL DUMP TRUCKS
Filed Oct. 23, 1965 5 Sheets-Sheet 4

Inventor
Paul E. Miller
Frederick J. Henke
Attorney

United States Patent Office 3,307,724
Patented Mar. 7, 1967

3,307,724
ATTACHMENT FOR INDUSTRIAL
DUMP TRUCKS
Paul E. Miller, Fort Wayne, Ind., assignor to International
Harvester Company, a corporation of Delaware
Filed Oct. 23, 1965, Ser. No. 503,480
8 Claims. (Cl. 214—313)

This invention relates to an attachment for industrial dump trucks, and the like and more particularly to an attachment adapted to to be used in conjunction with a conventional fork lift industrial truck and a common type of container having a two-way entry pallet portion whereby the fork lift truck is converted into a dump truck for lifting, carrying and dumping materials which are bulky or of such nature as to require handling in containers of substantial size.

Many devices and structures have heretofore been proposed for attachment to such a truck having a fork lift elevator so as to enhance the versatility of the implement. Some of these attachments and structures were concerned with the transporting of bulk material and generally embodied a specially-designed expensive bucket or box whereby the material contained within the bucket or box could be transported and the bucket or box shifted to a dumping position to discharge its contents.

It is a particular object of the present invention to provide a relatively inexpensive attachment for use with a conventional fork lift industrial truck and a conventional metal container, and especially such a container having a two-way entry pallet portion and commonly known in the material handling field as a "tote" or "gondola" box whereby the fork lift truck may be converted quickly and easily to an industrial dump truck.

The foregoing and other important objects and desirable features inherent in and encompassed by the invention together with many of the purposes and uses thereof will become readily apparent from the description which follows, in connection with the annexed drawings wherein:

FIG. 5 is a sectional view taken substantially along line 5—5 of FIG. 2;

FIG. 6 is a fragmentary sectional view taken substantially along line 6—6 of FIG. 2;

FIG. 7 is a vertical sectional view taken substantially along line 7—7 of FIG. 2;

FIG. 8 is a plan view of the attachment with container disconnected therefrom and partially broken away the better to illustrate the invention;

Figure 1:
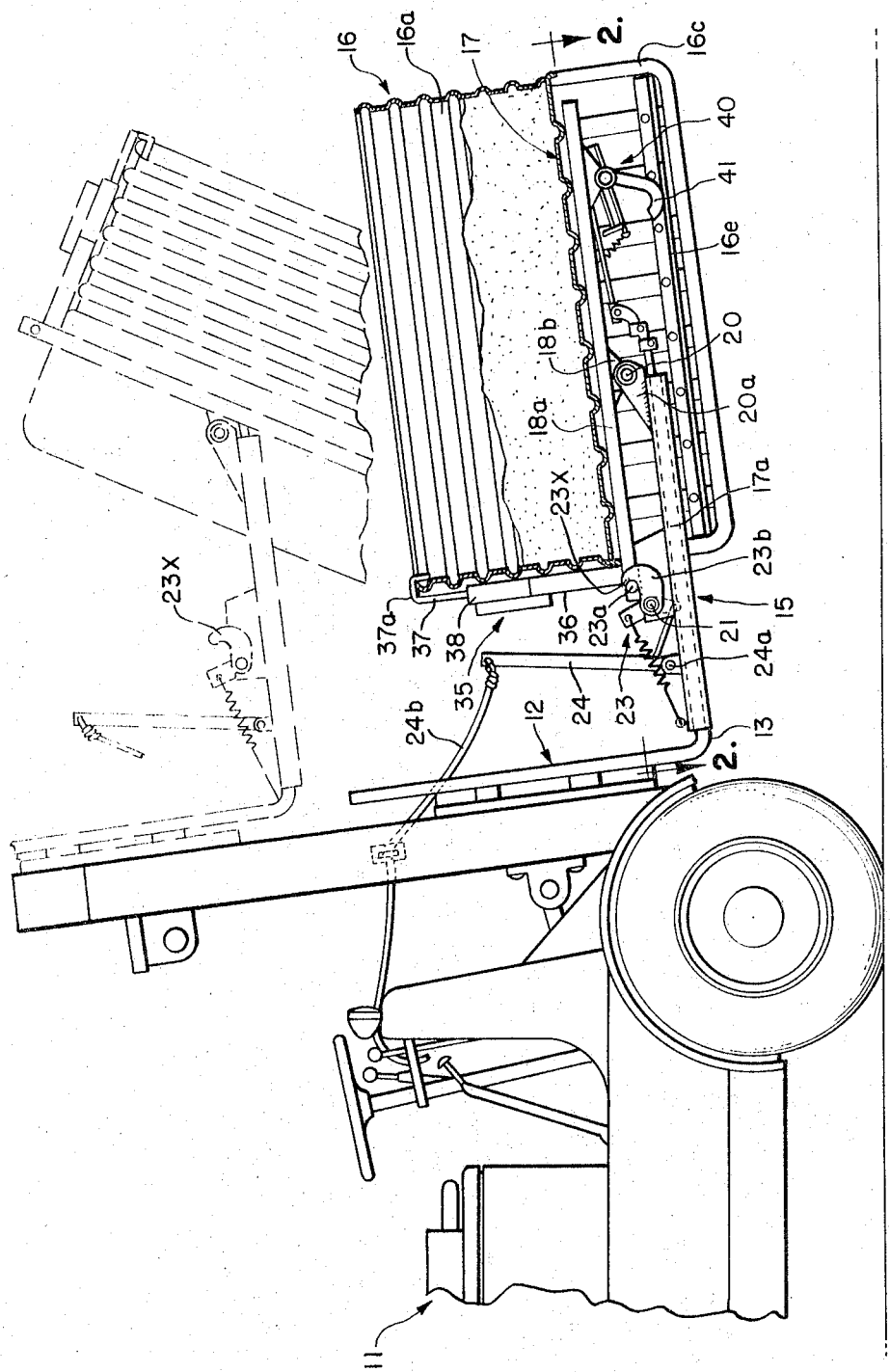
FIG. 1 is a side elevational view of the forward portion of a conventional industrial truck equipped with an attachment embodying the invention, with a container in place; the improved attachment and container being shown, in elevated, dumping position in broken lines.

Referring to the drawings, and particularly to FIGS. 1–7 inclusive, the industrial truck 11 is provided with a conventional fork lift mechanism 12 including forwardly extending forks 13, operable in well-known manner by a conventional hydraulic power system for receiving and supporting a work load, usually in a container, and lifting and transporting the same.

A dump attachment 15 embodying the present invention and having thereon a removable container 16 in operative position, as shown in FIG. 1, comprises a generally horizontal U-shape base 17 and a generally rectangular work supporting frame 18 mounted thereon in tiltable relation therewith.

Base 17 is provided with spaced generally tubular arms 17a, 17b connected by transverse member 17c and respectively arranged for receiving forks 13 in operative supporting relation in conventional manner, and with conventional fastenings.

Arms 17a, 17b are provided with generally parallel, spaced upstanding flanges 20a, 20b and 21a, 21b, respectively bored for receiving shafts 20, 21. Detachable collars 20c are provided adjacent the extremities of shaft 20 for restricting longitudinal movement of shaft 20 in relation to flanges 20a, 20b.

Longitudinally extending members 18a of work supporting frame 18 have depending flange portions 18b terminating in bearing portions 18c for receiving shaft 20 for relative rotation, said flange portions being disposed in predetermined spaced relation with the end portions of members 18a and said bearing portions and said shaft being arranged to enable ready tilting of frame 18 about the generally horizontal axis of said shaft through an angle of approximately 90°.

Latch assemblies 23 for releasably securing frame 18 in relation to base 17 include lugs 23a provided at opposite ends of transverse member 18d of frame 18 for engagement with hooks 23b which are mounted on shaft 21 for rotation therewith, said lugs and hooks being arranged to cooperate releasably to secure frame 18 in generally horizonal position. Hooks 23b are spring-biased into locking engagement with lugs 23a when frame 18 is in generally horizontal position on base 17; arm 21a mounted on shaft 21 being tied to post or eyelet 17d on base 17 by spring 17e. Shaft 21 is rotatable by means of lever 24 pivotally mounted adjacent one end 24a thereof on base 17, and connected by link 25 with arm 21b mounted on shaft 21 in opposed relation with arm 21a for moving hooks 23b into and out of locking relation with lugs 23a. Remote operator control of lever 24 is accomplished by means of a flexible member 24b of suitable material releasably secured to said lever adjacent its free extremity.

Dump attachment 15 comprises additionally hydraulic power operated mechanisms; one comprising a plurality of clamp assemblies for releasably maintaining a work load such as container 16 and contents thereof in operative position on frame 18; another for tilting frame 18 and the work load to discharge or dump the latter; each under operator control. For these purposes two conventional hydraulic cylinders 30, 31 are provided, each in operative communication with a conventional hydraulic power system carried by truck 11 and under operator control.

The first of these mechanisms, namely the clamp assemblies with which cylinder 30 is associated, generally are tailored to the conventional type of container 16 illustrated. Variously known as a skid, gondola, tote box, it may be noted that container 16 has a generally rectangular corrugated metal bin 16a mounted on an inverted, open-ended trough-like support 16b, the sidewalls 16c of which may be regarded as runners or skids and are of such dimensions and so spaced as to admit work supporting frame in work load stable supporting relation beneath bin 16a. Interiorly of the skids 16c extending longitudinally thereof in predetermined spaced relation with their bottom edges angle bars 16d having inwardly extending flange portions 16e (FIGS. 2, 4) are mounted for a purpose to be noted.

Work supporting frame 18 is so conformed and arranged to operate that when attachment 15 is in suitable operative position of adjustment on truck 11 upon forward movement of the truck under operator control frame 18 will be receivable between sidewalls 16c of an available container 16 to accommodate and upon appropriate operation of the lift mechanism of truck 11, to support and lift the same.

Suitable seating and retention of container 16 upon frame 18 is provided by multiple means. These include an upstanding transversely extending flange 18e on said frame adjacent to its forward extremity and serving to engage the lower portion of the forward wall 16 of the container and restrict sliding movement of the container longitudinally of the frame.

Figure 3:
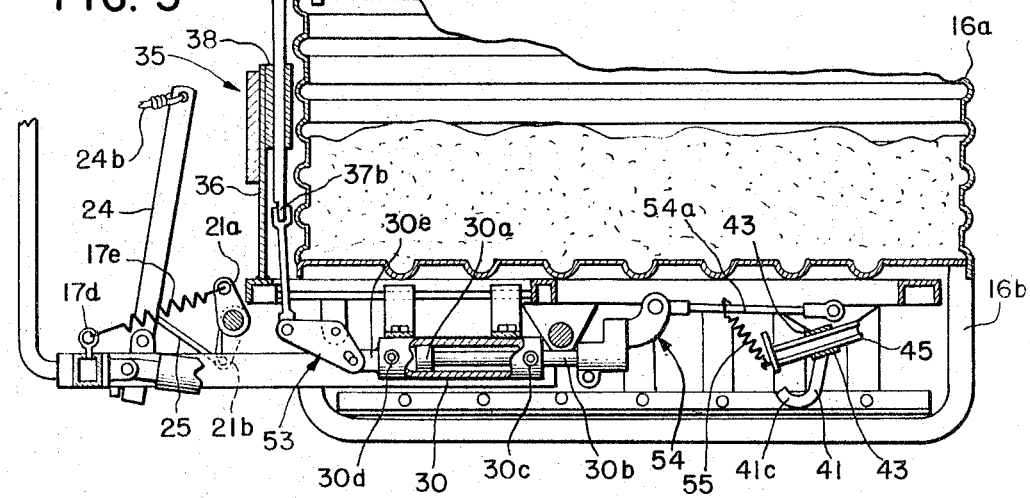
FIG. 3 is a sectional view taken substantially along line 3—3 of FIG. 2.

An adjustable clamping assembly 35 for releasably retaining container 16 in operative position on frame 18 includes an upstanding supporting frame 36 mounted on rear transverse member 18f; also a clamp member 37 slidably supported for up and down movement in sleeve 38 mounted on frame 36, and having an upper reversely curved hook portion 37a adapted to engage an upper rim portion 16g of container 16 in clamping relation. Adjustment of member 37 from an inoperative position illustrated in FIG. 9 to an operative clamping position illustrated in FIGS. 1 and 3 is accomplished by operation of hydraulic cylinder 30 in a manner to be described.

A second adjustable clamp assembly 40 for releasably retaining container 16 in operative position on frame 18 and complementing clamp assembly 35 also is operated by cylinder 30. Clamp assembly 40 includes a pair of opposed adjustable angular, reversely curved members 41. These have leg portions 41a carried for rotation about a common horizontal axis in sleeves 42 depending from frame members 18a. The leg portions 41a of clamp members 41 are of such dimensions and spring biased in retracted position in relation to sleeves 42 whereby the end portions 41b of legs 41a project from said sleeves to positions opposing one another in predetermined spaced relation as illustrated in FIG. 7.

Sleeves 42 are bridged by parallel spaced bars 43 which provide a guideway 44 for receiving a generally triangular wedge 45 in sliding relation therewith.

Hydraulic cylinder 30 is carried on parallel spaced cradles 50 having laterally extending tongue portions 50a arranged in sliding relation with longitudinally extending ways or grooves 51 provided in bars 52 which are disposed in parallel spaced relation with members 18a and supported adjacent their end portions on transverse members 18f and 18g of frame 18.

Cylinder 30 is in operative communication at each end thereof with the hydraulic power system of truck 11 by means of flexible fluid supply lines 30c, 30d, and is equipped with a piston 30a which is operatively connected with a rod 30b extending forwardly of the cylinder. Linkage 53 interconnecting the rearward end portion 30c of cylinder 30 and the lower end portion 37b of clamp member 37 is arranged to operate whereby movement of cylinder 30 longitudinally of bars 52 is imparted correspondingly to member 37.

Rod 30b is operatively interconnected through linkage 54 with wedge 45 whereby longitudinal movement of rod 30b is correspondingly imparted to wedge 45. Guidance of wedge 45 in such movement is provided by crotched upstanding member 45a carried by wedge 45 adjacent its rearward extremity and adapted to straddle rod 54a of linkage 54, member 45a being biased in such straddling relation by spring 55 arranged therebetween.

Figure 2:
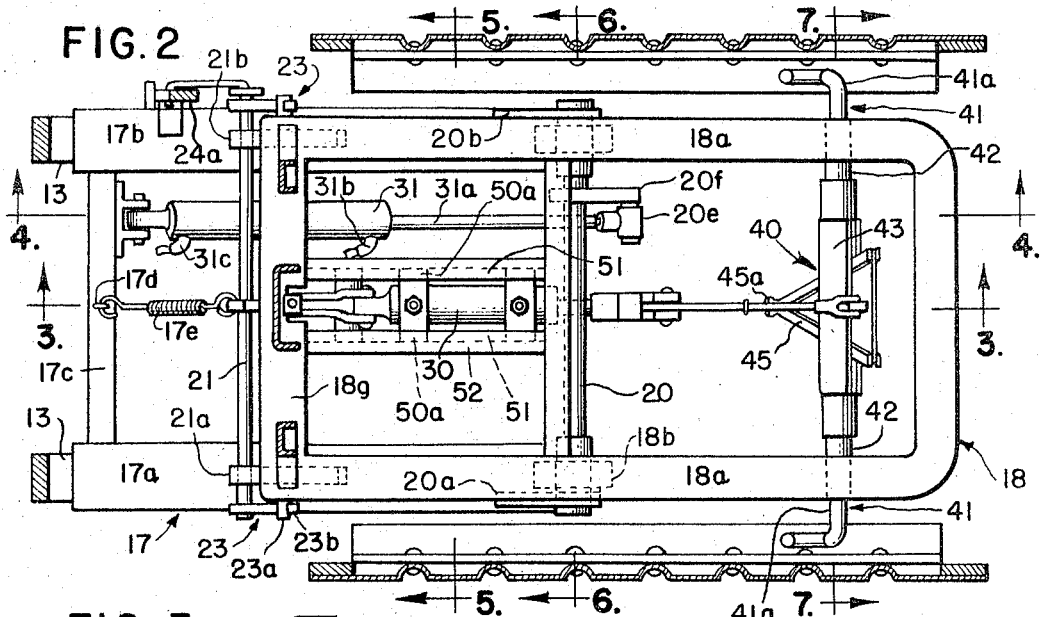
FIG. 2 is a sectional view taken substantially along line 2—2 of FIG. 1.
Figure 9:
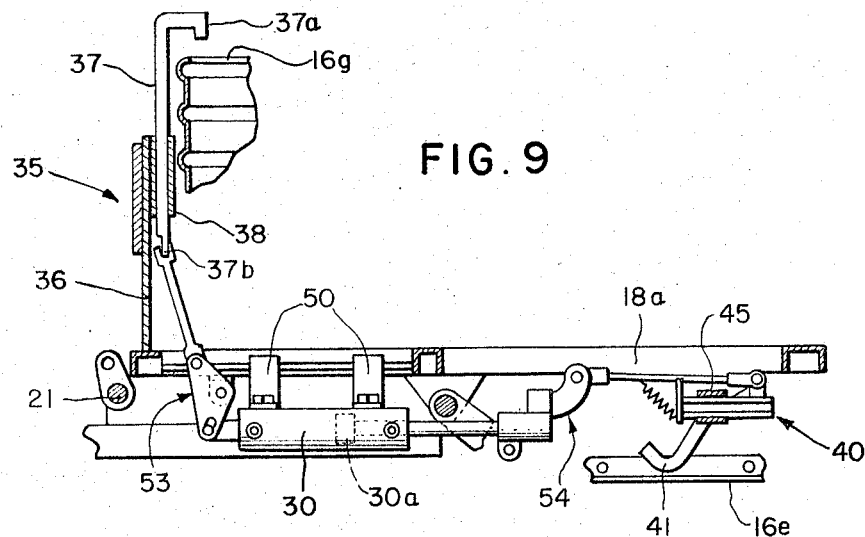
FIG. 9 is a fragmentary vertical sectional view taken substantially along line 9—9 of FIG. 8.
Figure 10:
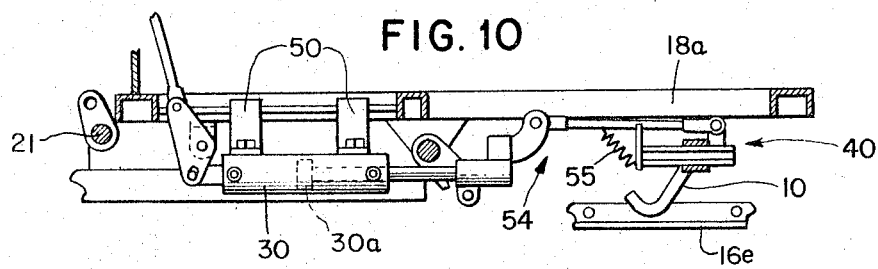
FIGS. 10, 11 and 12 are views similar to FIG. 9 illustrating in sequence the steps of securing the container to the attachment.

Cylinder 30, clamp assemblies 35 and 40, and their associated parts are so conformed and arranged to operate that upon suitable application of fluid under pressure to cylinder 30 through line 30c, with the parts in initial inoperative position and a container 16 in working position on frame 18, piston 30a, rod 30b, and wedge 45 will be moved to the left, from the position indicated in FIGS. 8 and 9 to that of FIGS. 2 and 10. It will be noted that in the course of this movement wedge 45 has advanced to a position midway of guideway 44 thereby wedging clamp members 41 outwardly, from the inoperative position of FIG. 8 to the position of FIG. 2 in which latter position they are in condition to be rotated into clamping engagement with flanges 16e of container 16.

Figure 11:
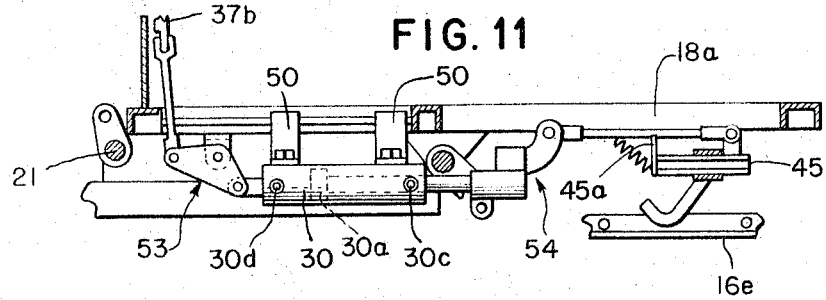

Upon continued application of fluid under pressure to cylinder 30 through line 30c, cylinder 30 itself moves, to the right, from the position illustrated in FIG. 10 to that of FIG. 11, wedge 45 and clamping members remaining in previously operated position. This movement of cylinder 30 causes an operation of linkage 53, moving clamp member 37 downwardly from inoperative position of FIG. 9 to that of FIG. 3 in which container 16 is clamped in working position on frame 18.

Figure 12:
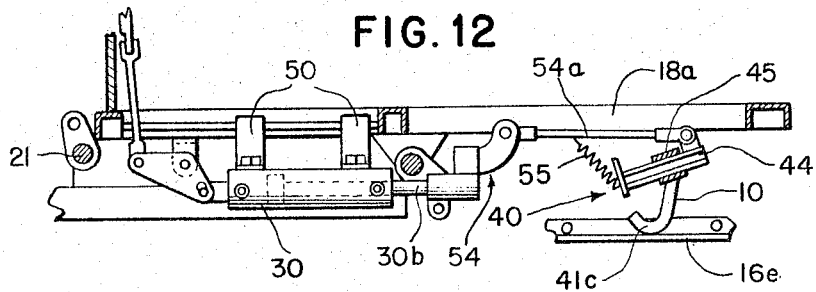

Upon continued application of fluid under pressure to cylinder 30 in the manner stated piston 30a is further retracted to the position illustrated in FIG. 12. Wedge 45 being held in guideway 44, such movement of the piston, through rod 30b and linkage 54, including pivot 54b intermediately of rod 54a and wedge 45 overcoming spring 55, causes rotation of wedge 45 and of guideway 44 and clamp members 41, bringing the outer curved portions 41c thereof into clamping engagement with flanges 16e and holding container 16 in operative position on frame 18.

The pressure through line 30c being relieved and pressure being applied correspondingly through line 30d reversal of the operation of the parts occurs, releasing clamp members 37 and 41, and freeing container 16 for removal from frame 18.

Tilting of frame 18 and the dumping of the contents of container 16 are accomplished by the operation of cylinder 31 and mechanism comprising a tilting assembly 32 associated therewith. Unlike cylinder 30, cylinder 31 is supported on base 17 instead of frame 18, being supported adjacent to its rearward end for pivotal movement about a generally horizontal axis on transverse member 17c of base 17. Piston rod 31a of cylinder 31 is connected adjacent its outer extremity for pivotal movement about the generally horizontal axis of pin 20e carried adjacent the lower extremity of arm 20f which is mounted on shaft 20 for rotation therewith.

Cylinder 31 is in operative communication adjacent each end thereof with the hydraulic power system of truck 11 by means of fluid supply lines 31b, 31c.

Figure 4:
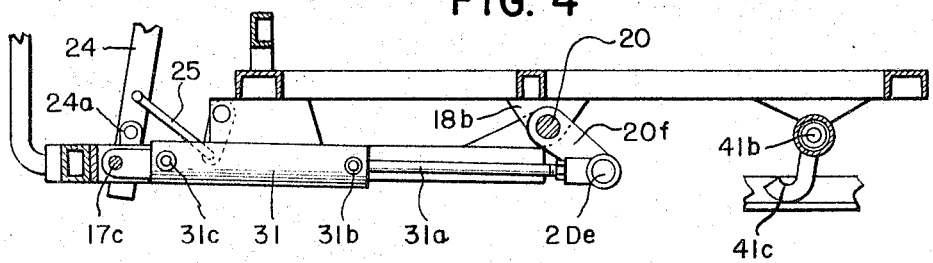
FIG. 4 is a sectional view taken substantially along line 4—4 of FIG. 2.

Upon release of latch 23 by operation of lever 24 when the work load is in the desired lift position, and the application of pressure fluid to cylinder 31 through line 31b, piston rod 31a moves to the left as viewed in FIGS. 2 and 4, causing rotation of shaft 20 and tilting of frame 18 and container 16 under operator control, to a position illustrated in dotted lines in FIG. 1. Reversal of the operation occurs upon relieving the pressure in line 31b and applying pressure through line 31c.

A modification of the invention illustrated in FIGS. 13, 14, 15, and 16 utilizes clamping mechanisms operated by a drum or reel and cable system instead of the hydraulic power arrangement previously described. In this form of invention the dump attachment 65, which functions generally in the same manner as dump attachment 15 comprises a base 67 generally similar to base 17 and supported in like manner on forks 13 of industrial truck 11, together with a frame 68 similar generally to frame 18 and releasably supported in tiltable relation on base 67 as frame 18 is supported on base 17, corresponding parts being employed.

Instead of the hydraulic power operated mechanisms for releasably maintaining container 16 and contents thereof in operative position on frame 68, and for tilting frame 18 and the work load to discharge or dump the latter, dump attachment 65 utilizes a plurality of clamp assemblies 70, 75 and cable system 80 for operating them. It is a feature of this form of invention that operation of clamp assembly 75 serves the dual function in cooperation with other parts, of maintaining container 16 in working position on, and tilting the same in relation to frame 68, which is generally of the same rectangular form as frame 18.

Figure 14:
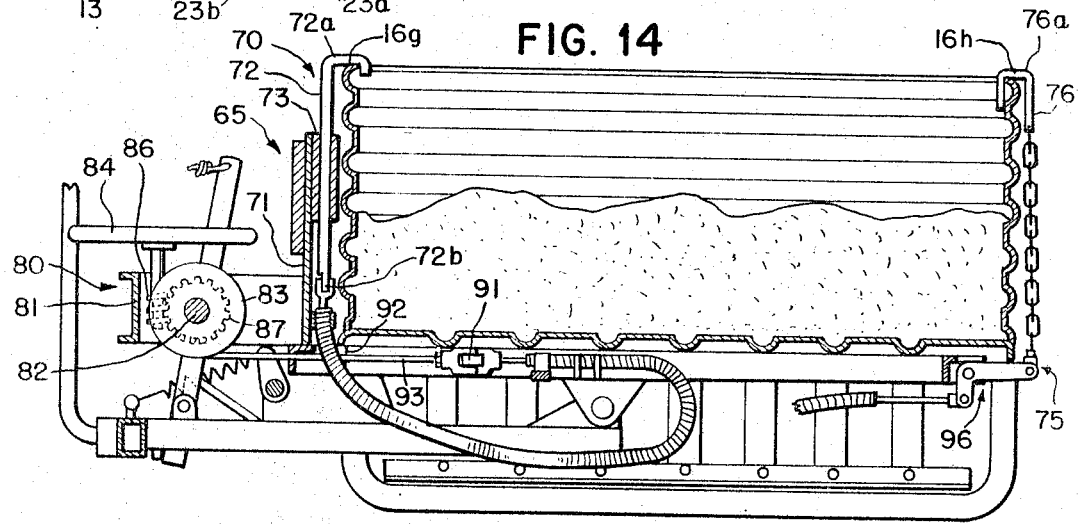
FIG. 14 is a sectional view taken substantially along line 14—14 of FIG. 13 with container releasably connected to the attachment.

Adjustable clamp assembly 70 for releasably retaining container 16 in operative position on frame 68 includes upstanding supporting frame 71 mounted on rear transverse member 68f of frame 68, also a clamp member 72 generally similar to member 37 slidably supported for up and down movement in sleeve 73 mounted on frame 71, and having an upper reversely curved hook portion 72a adapted to engage an upper rim portion 16g of container 16 in clamping relation. Adjustment of member 72 from an inoperative position such as that illustrated in FIG. 9 to the clamping position illustrated in FIG. 14 is accomplished by operation of reel and cable system 80 in a manner to be described.

Second adjustable clamp assembly 75 for complementing clamp assembly 70 in releasably retaining container 16 in operative position on frame 68, and for tilting the latter, includes a clamp member 76 having an upper reversely curved hook portion 76a adapted to engage an upper rim portion 16h of container 16 in clamping relation. Adjustment of member 76 in operative positions, the same having initially been manually positioned for the operation as illustrated in FIG. 14, is also accomplished by operation of reel and cable system 80 in a manner to be described.

Reel and cable system 80 for operating clamp assemblies 70, 75 is supported on frame 68. For this purpose a rearwardly extending bracket 81 is mounted adjacent one side thereof on supporting frame 71 for supporting shaft 82 for rotation about a horizontal axis. A drum 83 mounted on shaft 82 for rotation therewith is rotatable by a hand wheel 84 on shaft 85 mounted on bracket 81 for rotation about a generally vertical axis and carrying a worm 86 in meshing relation with a gear 87 arranged on shaft 82 for rotation therewith. A cable 90 secured at one end on drum 83 and windable and unwindable thereon upon rotation of wheel 84, is connected adjacent its other end with slide member 91 arranged in slidable relation in slots 92 provided in spaced bars 93 supported adjacent opposite ends thereof on transverse members 68f and 68g of frame 68; slide member 91 being slidable forwardly and rearwardly of the frame depending on the direction of rotation of wheel 84.

Slide member 91 is operatively connected adjacent opposite ends thereof by flexible cables 94, 95, respectively, with clamp assemblies 70, 75; cable 94 being tied adjacent its remote end to the lower end portion 72b of clamp member 72, and cable 95 being operatively connected through linkage 96 with clamp member 76.

Figure 13:
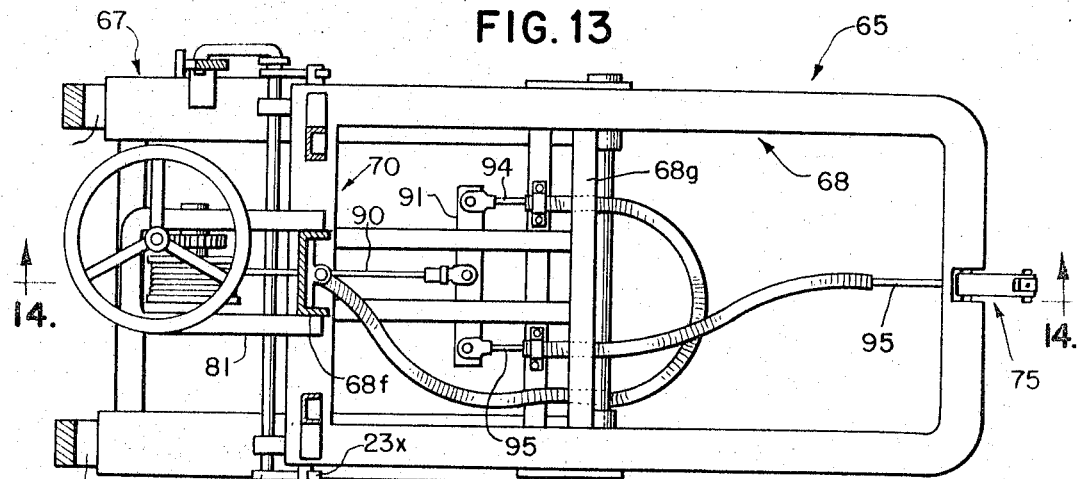
FIG. 13 is a plan view of a modification of the invention without container.

It will be apparent from the foregoing description that upon winding cable 90 on drum 83 slide member 91, having some of the attributes of a whipple-tree, will be drawn to the left in FIG. 13 thereby tautening cables 94, 95, and drawing clamp members downward upon rims 16g and 16h of container 16 whereby to clamp the latter in position on frame 68.

Figure 15:
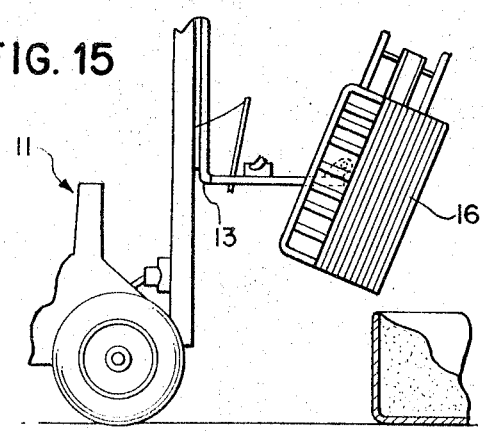
FIG. 15 is a general side elevational view showing the relationship of the parts when the container is in its unloading position.

Thereafter upon operation of latch assembly 23 in the manner previously described, releasing lugs 23a from hooks 23b, frame 68 and container 16 having been raised to a suitable position for dumping by operation of the lift mechanism of truck 11, frame 68 will rotate about shaft 20, tilting container 16 to dumping position illustrated in FIG. 15.

It will be appreciated that such rotation of frame 68 is facilitated by positioning shaft 20 in closer proximity to the rearward end portion of the frame as illustrated in FIGS. 2, 8, and 13, thereby to provide a margin of leverage for the purpose.

Figure 16:
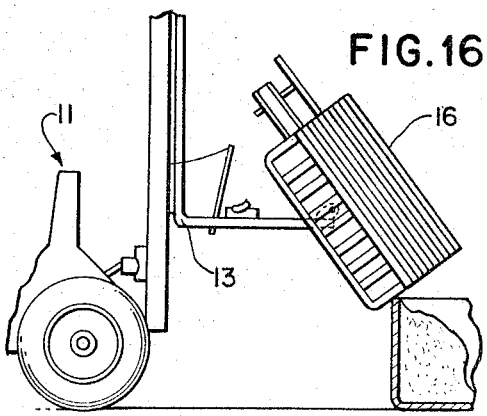
FIG. 16 is a view similar to FIG. 15 showing the manner in which the frame and container are moved to their undumped or load-carrying positions.

Container 16, with either frame 18 or frame 68 will be returned to operative position for re-loading upon lowering of the lift, and manipulation of the truck as illustrated in FIG. 16. In this connection it will be noted that latch assembly 23 is arranged to operate whereby the latching of the frame to the base in either form of the invention will be effected upon the returning of the frame to horizontal position in relation to the base, hooks 23b being spring-biased to engaging relation with lugs 23a and having a cam portion 23x in cooperative relation with lugs 23a enabling an automatic locking operation upon the moving of the frame into position for reloading on its base.

Thus two forms of structure readily attachable to and removable from an industrial truck equipped with a conventional fork lift mechanism for converting the same into an efficiently operable dump truck have been described. It will be understood that variations therefrom may be made without departing from the scope of the invention as defined in the claims which follow.

I claim:

1. A dump attachment for an industrial truck equipped with a fork lift mechanism and a hydraulic power system operable under manual control, said lift mechanism comprising a plurality of laterally spaced forks extending generally horizontally, forwardly of said truck and generally parallel to the longitudinal axis of the truck, said dump attachment comprising (a) a base comprising a plurality of generally tubular arms arranged in corresponding spaced relation for receiving said forks in snugly fitting relation whereby to support said base on said forks, and a generally horizontal transverse member interconnecting said arms adjacent their rearmost extremities, (b) a work load container supporting frame mounted on said base for tilting movement about a horizontal axis generally perpendicular to the longitudinal axis of the truck and in parallel spaced relation with said transverse member, (c) a latch assembly comprising means on said base and means on said frame in cooperative relation with one another for releasably maintaining said frame in untilted relation with said base under operator control, (d) first and second clamp assemblies mounted on said frame and operable to engage complementary means on a work load container supported thereon releasably to secure said container in operative position thereon, said first clamp assembly comprising a first clamp member operable between first and second positions releasably to engage first complementary means on said container in clamping relation, said second clamp assembly comprising a plurality of second clamp members arranged in spaced relation with said first clamp member and with one another and operable between inoperative and operative positions releasably to engage second complementary means on said container in clamping relation, (e) first hydraulic power means on said frame in operative communication with said hydraulic power system and operatively connected with said clamp assemblies, whereby to operate said clamp members to and from said positions, (f) a tilting assembly comprising means on said base and means on said frame arranged in cooperative relation with one another and operable to tilt said frame in relation to said base, (g) second hydraulic power means on said base in operative communication with said hydraulic power system and operatively connected with said tilting assembly for tilting said frame, in relation to said base whereby to dump the contents of said container, the parts being so conformed and arranged to operate that upon said truck and said lift mechanism having been operated to move said attachment and container with work load in operative position thereon to selected position for dumping and said latch assembly having been operated to release said frame, said second hydraulic power means may be operated to tilt said frame in relation to said base whereby to dump said work load.

2. A dump attachment according to claim 1 in which the first clamp assembly comprises (a) a first clamp member slidably supported for up and down movement in a sleeve mounted on said frame and having an upper reversely curved hook portion adapted to engage complementary means on said work load container in clamping relation, (b) linkage interconnecting said clamp member adjacent its lower extremity and said first hydraulic power means and arranged to operate whereby upon operation of said power means under operator control said clamp member will move between inoperative and operative positions whereby releasably to engage said first complementary means in clamping relation thereby releasably to maintain said container in operative position on said frame, said frame being provided with stop means arranged in opposed spaced relation with said first clamp member and extending generally transversely of the longitudinal axis of said frame for restricting sliding movement of said container longitudinally of said frame.

3. A dump attachment according to claim 1 in which the second clamp assembly comprises (a) second clamp members which are generally angular in shape and have a leg portion and a reversely curved clamping portion, said second clamp members being mounted on said frame in adjustable opposed spaced relation with one another, their respective leg portions being carried in sleeves depending from said frame in co-axial spaced relation with one another, and said leg portions being arranged for sliding movement along and rotation about a common generally horizontal axis generally perpendicular to the longitudinal axis of said frame, said second clamp members being spring-biased to an inoperative position in which the proximate extremities of said leg portions project from said sleeves in predetermined spaced relation with one another, (b) means spanning said sleeves and providing a guideway between said proximate extremities of said leg portions, (c) a generally triangular wedge slidable in said guideway and having camming surfaces arranged upon operation of said wedge in one direction to bear upon adjacent extremities of said leg portions whereby to position said clamp members for clamping operation, (d) second linkage operatively interconnecting said wedge and said first hydraulic power means, (e) said second linkage comprising spring means biasing said clamp members in said position of operation, (f) said clamp members being so conformed and arranged whereby, having been so positioned for operation, upon subsequent rotation of said leg portions in a predetermined direction said clamping portions will clampingly engage said second complementary means on said container thereby releasably to secure said container in operative position on said frame, (g) said second linkage and said wedge and their associated parts being operatively coordinated whereby upon said hydraulic power means being operated, said second linkage will operate said wedge first in said one direction to position said clamp members for clamping operation and thereafter, upon continued operation of said power means, said second linkage will operate said wedge to rotate said leg portions in said predetermined direction to effect said clamping engagement.

4. A dump attachment according to claim 3 in which the clamping portions of the second clamp members are generally arcuate in shape and arranged, upon rotation of said leg portions in said predetermined direction, cammingly to engage corresponding surfaces on said other complementary means whereby releasably to restrict movement of said container in relation to said frame vertically and laterally thereof.

5. A dump attachment according to claim 1 in which the first clamp assembly comprises (a) a first clamp member slidably supported for up and down movement in a sleeve mounted on said frame and (b) first linkage operatively interconnecting said clamp member and said first hydraulic power means, and said second clamp assembly comprises (c) second clamp members generally angular in shape and having a leg portion and a reversely curved clamping portion, (d) said second clamp members being mounted on said frame in adjustable opposed relation with one another, their respective leg portions being carried in sleeves depending from said frame in co-axial spaced relation with one another and said leg portions being arranged for sliding movement along and rotation about a common generally horizontal axis generally perpendicular to the longitudinal axis of said frame, (e) said second clamp members being spring-biased to an inoperative position in which the proximate extremities of said leg portions project from said sleeves in predetermined spaced relation with one another, (f) means spanning said sleeves and providing a guideway between said proximate extremities of said leg portions, (g) a generally triangular wedge slidable in said guideway and having camming surfaces arranged upon operation of said wedge in one direction to bear upon adjacent extremities of said leg portions whereby to position said second clamp members for clamping operation, (h) second linkage operatively interconnecting said wedge and said first hydraulic power means, (i) said second linkage comprising spring means biasing said second clamp members in said position of operation, (j) said second clamp members being so conformed and arranged whereby, having been so positioned for operation, upon subsequent rotation of said leg portions in a predetermined direction said clamping portions will clampingly engage said second complementary means on said container thereby releasably to secure said container in operative position on said frame, (k) the parts being so conformed and arranged to operate whereby with a work load container in operative position on said frame, said frame being in latched position on said base, and said clamp assemblies being in inoperative position, upon continuing operation of said first hydraulic power means under operator control, said linkages and said clamp assemblies will operate in sequence first to condition said second clamp members for clamping operation, then to operate said first clamp assembly whereby to move said first clamp member into clamping engagement with said first complementary means, and thereafter further to operate said second clamp assembly to effect clamping engagement of said second clamp members and said second complementary means.

6. A dump attachment according to claim 4 in which said first hydraulic power means comprise a hydraulic cylinder mounted on said frame in slidable relation therewith and said first linkage is operatively connected with said cylinder, adjacent one end thereof, said cylinder having a piston rod extending therefrom at its opposite end, said piston rod being operatively connected with said second linkage, said cylinder and said linkages and their associated parts being so conformed and arranged to operate whereby when said clamp assemblies are in inoperative position and said frame is in latched position on said base, upon continuing application of fluid under pressure to said cylinder to operate said piston rod in one direction said linkages and said clamp assemblies will operate in sequence, first to operate said second linkage to slide said wedge in relation to said guideway thereby to position said second clamp members for clamping operation, second to slide said cylinder longitudinally in relation to said frame thereby to operate said first linkage to move said first clamp member into clamping position in relation to said first complementary means, and third further to operate said second linkage thereby to rotate said leg portions of said second clamp members and move the clamping portions thereof into clamping position in relation to said second complementary means, and upon withdrawal of such application of fluid under pressure to said cylinder, and upon continuing application of fluid under pressure to said cylinder to operate said piston in the opposite direction, said linkages and said assemblies will operate in reverse sequence.

7. A dump attachment for an industrial truck equipped with a lift mechanism comprising a plurality of laterally spaced forks extending generally horizontally forwardly of said truck and generally parallel to the longitudinal axis of the truck, said dump attachment comprising, (a) a base comprising a plurality of generally tubular arms arranged in corresponding spaced relation for receiving said forks in snugly fitting relation whereby to support said base on said forks, and a generally horizontal transverse member interconnecting said arms adjacent their rearmost extremities, (b) a work load container supporting frame mounted on said base for tilting movement about a horizontal axis generally perpendicular to the longitudinal axis of the truck and in parallel spaced relation with said transverse member, (c) a latch assembly comprising means on said base and means on said frame in cooperative relation with one another for releasably maintaining said frame in untilted relation with said base under operator control, (d) first and second clamp assemblies mounted on said frame and operable to engage complementary means on a work load container supported thereon releasably to secure said container in operative position thereon, said first clamp assembly comprising a first clamp member manually positionable for clamping engagement with first complementary means on said container, said second clamp assembly comprising a second clamp member manually positionable for clamping engagement with other complementary means on said container, (e) a reel and cable system mounted on said frame, said system comprising a drum and a cable windable thereon and releasable therefrom under operator control, (f) linkages operatively interconnecting said assemblies and said cable, said system, said linkages and said assemblies and the parts associated therewith being so conformed and arranged to operate whereby with said attachment in operative position on said truck and a work load container in operative position on said frame, said frame being in latched position on said base, and said clamp members being in position for said clamping engagement, upon suitably tautening said cable by winding thereof on said drum said clamp members will clampingly engage their said respective complementary means thereby releasably to secure said container in operative position on said frame, and thereafter upon said truck and said lift mechanism being operated to position said attachment and container for dumping, and said latch assembly operated to release said frame for tilting, and upon further tautening of said cable by continued winding thereof upon said drum, said frame will tilt to dump the work load of said container.

8. A dump attachment according to claim 6 in which the linkages operatively interconnecting the clamp assemblies and the cable comprise (a) a first linkage and
(b) a second linkage, and
(c) an intermediate link interconnecting said first and second linkages and said cable, said intermediate link being slidable longitudinally of said frame, medianly thereof,
(d) said first linkage being connected adjacent one end thereof with said first clamp member and adjacent the opposite end thereof with said sliding member adjacent one end thereof,
(e) said second linkage being connected adjacent one end thereof with said second clamp member and adjacent the opposite end thereof with said sliding member adjacent the opposite end thereof,
(f) said cable being connected with said intermediate link medianly thereof, the parts being so conformed and arranged to operate whereupon said cable being tautened by winding thereof upon said drum said first and second linkages will be correspondingly tautened.

References Cited by the Examiner

UNITED STATES PATENTS

| 2,304,649 | 12/1942 | McDaniels | 214—313 |
| 2,482,692 | 9/1949 | Quales et al. | 214—620 |
| 2,582,759 | 1/1952 | Sass | 214—315 X |
| 2,948,426 | 8/1960 | Smith et al. | 214—314 |
| 3,206,052 | 9/1965 | Kennedy | 214—313 |

HUGO O. SCHULZ, *Primary Examiner.*